United States Patent [19]
Eness

[11] Patent Number: 4,464,791
[45] Date of Patent: Aug. 7, 1984

[54] ALL-LEVEL RAYLEIGH FADER

[75] Inventor: Orville M. Eness, Park Ridge, Ill.

[73] Assignee: Motorola, Inc., Schaumburg, Ill.

[21] Appl. No.: 410,222

[22] Filed: Aug. 23, 1982

[51] Int. Cl.$^3$ ............................................. H04B 17/00
[52] U.S. Cl. ...................................... 455/67; 331/78; 364/717; 455/326
[58] Field of Search .................... 455/67, 226, 52, 326; 364/717, 550, 551, 570; 331/78; 375/10; 324/57 N; 332/43 B, 44, 45

[56] References Cited
U.S. PATENT DOCUMENTS
3,238,472  3/1966  Crompton-Couvela ............... 332/44
4,032,850  6/1977  Hill ..................................... 455/326

OTHER PUBLICATIONS
IEEE Trans. on Vehicular Technology, vol. VT-29, No. 2, May, 1980, pp. 281-289, "A UHF Channel Simulator for Digital Mobile Radio", Edgar L. Caples et al. "A Multipath Fading Simulator for Mobile Radio," by Arredondo et al., Published in IEEE Transactions on Vehicular Technology, vol. VT-22, No. 4, Nov. 1973, at page 241.

Primary Examiner—Marc E. Bookbinder
Attorney, Agent, or Firm—Charles L. Warren; Edward M. Roney; James W. Gillman

[57] ABSTRACT

A Rayleigh fader for use with signals such as single-sideband and AM radio signals applies those signals to a 90-degree power divider. Each of the outputs of the power divider is taken to a separate double balanced mixer. Each separate double balanced mixer receives a mixing input from a noise source that includes a voltage-to-current converter. Mixed outputs of the two double balanced mixers are re-combined in a power combiner to produce a Rayleigh faded output.

9 Claims, 5 Drawing Figures

ALL-LEVEL RAYLEIGH FADER

BACKGROUND OF THE INVENTION

This invention relates to faders for radio signals.

A radio signal is said to be fading when the signal amplitude is observed to fluctuate at the receiver. In land-mobile radio, which uses frequencies that are usually restricted to line-of-site communication, fading is normally a result of the constructive or destructive interference which occurs among a number of different propagation paths. In the case of a fixed transmitter and a fixed receiver, fading results from the reflection of radio signals from moving objects, which causes the received sum to achieve values that vary. Similarly, in the case where a transmitter, a receiver, or both, are in motion, the effect of the relative motion between them may also produce a significant fluctuation in the received signal level. If the fluctuant signal reaches low values, the signal information is lost.

It is well known that the statistical distribution of fading is often that of a phasor having a phase angle that is distributed uniformly and having an amplitude that follows the Rayleigh distribution. Fading described by these statistics is called Rayleigh fading. An important measure of the performance of a radio receiver is its ability to handle a signal that has been subjected to Rayleigh fading. For this reason, Rayleigh faders have been designed and built as test equipment. In one form or another these faders split a signal into both in-phase and quadrature components, adjust the amplitudes of each of the quadrature components at a random rate, and recombine the adjusted components into a single component that is a Rayleigh-faded signal.

All of the faders that are known to date have been built for use in fading FM signals. An FM signal maintains a constant amplitude at the input to a fader. Faders currently in use are therefore designed to operate using an input signal that does not vary in amplitude. Such faders are not useful without modification in fading single-sideband or other AM signals. A single-sideband signal exists only when it is being modulated. When there is no modulation, there is no signal. Any fader that is to be used in fading single-sideband or AM must therefore work successfully with an input signal that may vary widely in amplitude.

SUMMARY OF THE INVENTION

It is an object of the present invention to provide a Rayleigh fader for use with radio signals that vary in amplitude.

It is a further object of the present invention to provide a Rayleigh fader for use with single-sideband signals.

It is a further object of the present invention to provide a Rayleigh fader for AM radio signals.

Other objects will become apparent in the course of a detailed description of the invention.

A Rayleigh fader for use with signals such as single-sideband and AM radio signals applies those signals to a 90-degree power divider. Each of the outputs of the power divider is taken to a separate double balanced mixer. Each separate double balanced mixer receives a mixing input from a noise source that includes a voltage-to-current converter. Mixed outputs of the two double balanced mixers are re-combined in a power combiner to produce a Rayleigh faded output.

DETAILED DESCRIPTION OF THE INVENTION

Figure 1:
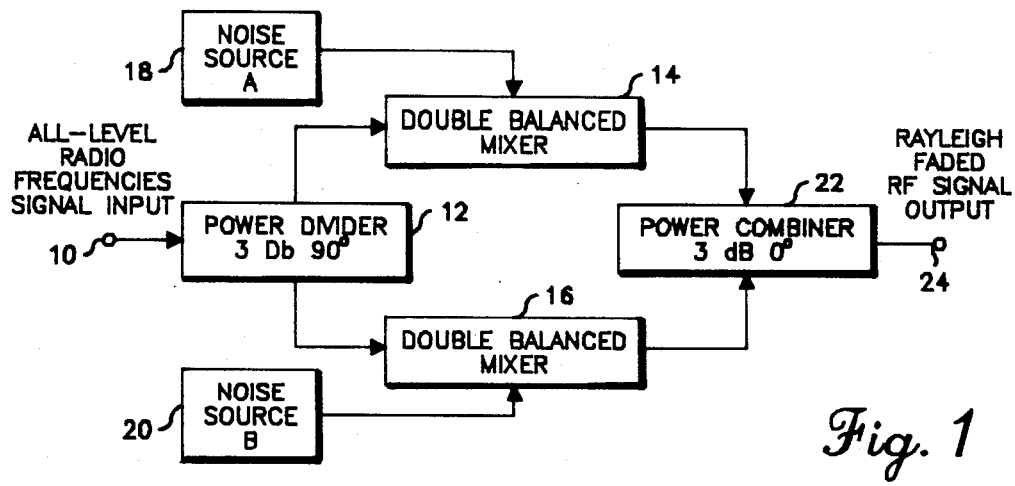
FIG. 1 is an overall block diagram of a circuit for the practice of the present invention.

FIG. 1 is a block diagram of the Rayleigh fader of the present invention. In FIG. 1, an RF signal that is to be faded is applied at terminal 10. While it is described here as an RF signal, it should be understood that the only frequency requirement is that the signal be capable of being handled by the components of the circuit of FIG. 1. The signal applied at terminal 10 is taken to power divider 12, a 3 db ninety-degree power divider. Powder divider 12 produces two outputs that are 90° out of phase with each other, and both of which are 3 db down in power from the signal applied at terminal 10. The two outputs from power divider 12 are taken to the balanced inputs of double balanced mixers 14 and 16. The balanced inputs are those often referred to as the RF and local-oscillator inputs. Double balanced mixer 14 receives as input from noise source 18 at its direct-coupled port. Double balanced mixer 16 receives an input at its direct-coupled port from noise source 20. The direct-coupled port is the one often referred to as an IF port. Outputs of both double balanced mixers 14 and 16 are taken to combiner 22, an in-phase combiner, where they are combined to produce at terminal 24 an output that will be a Rayleigh-faded version of the RF input signal that is applied to terminal 10.

As shown, the circuit of FIG. 1 resembles that of a Rayleigh fader for FM signals that was disclosed in an article entitled "A Multipath Fading Simulator for Mobile Radio" by Arredondo et al., published in IEEE Transactions on Vehicular Technology, Volume VT-22, No. 4, Nov. 1973 at page 241. However, the fader of Arredondo et al. is operable only with a signal such as an FM signal that has a constant amplitude at the input. The present invention is an improvement on that circuit that allows the use of such a Rayleigh fader with signals of varying amplitude and in particular, with single-sideband signals. In the circuit of the present invention, noise sources 18 and 20 of FIG. 1 are modified in a way that will be described to produce a circuit that is effective as a Rayleigh fader for single-sideband signals.

Figure 2:
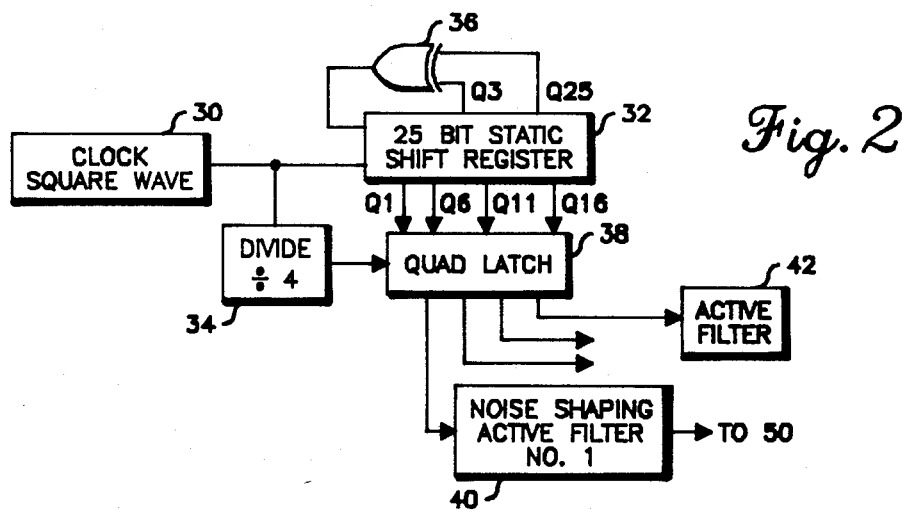
FIG. 2 is a functional block diagram of the noise source for use in the circuit of FIG. 1.
Figure 3:
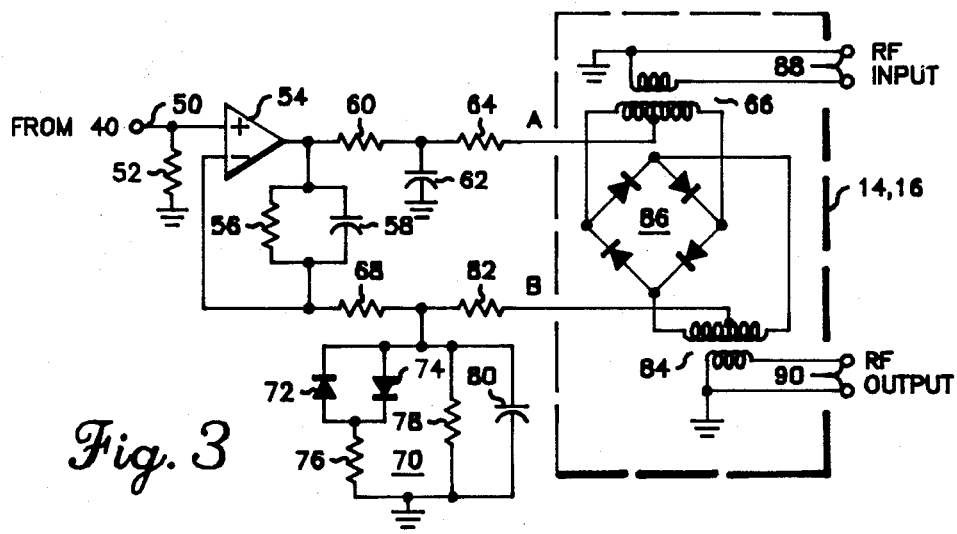
FIG. 3 is a voltage-to-current converter and double balanced mixer for use in the circuit of FIG. 1.

FIG. 2 is a circuit diagram of a portion of a noise source such as noise source 18 of FIG. 1 and FIG. 3 is a circuit diagram of a voltage-to-current converter and a low-pass filter that is a part of a noise source 18 or 20 of FIG. 1. FIG. 3 also includes double balanced mixer 14 or 16 of FIG. 1. In FIG. 2 a clock 30 generates a square wave at a frequency of the order of 50 KHz that is applied directly to a shift register 32 and to a divider 34. Shift register 32 is a twenty-five-stage static shift register. Outputs from stages 3 and 25 of shift register 32 are taken to exclusive OR (EXOR) gate 36, the output of which is reapplied to the data input of shift register 32. The output of divider 34 is taken to quad latch 38 as a clock pulse, and four outputs of shift register 32, spaced five stages apart, are applied as inputs to quad latch 38. The elements thus far described in FIG. 2 constitute one noise source at each output terminal from quad latch 38. One output of quad latch 38 is shown as being applied to active filter 40, and a second such output is applied to active filter 42. Active filters 40 and 42 are low-pass filters having adjustable cutoff frequencies that correspond to various simulated vehicle speeds. Each has a curve that rises 6 dB above the pass bend at the knee, and then falls off at 18 dB per octave.

The outputs of active filter 40 and 42, suitably processed, will serve to represent the internal sources of noise sources 18 and 20 of FIG. 1. Further processing of the outputs will be shown only for one of the outputs of FIG. 2. Thus, in FIG. 3, terminal 50 receives an output from active filter 40 of FIG. 2. This output is applied across resistor 52 as an input to an additive terminal of operator amplifier 54. The output of operational amplifier 54 is applied to one end of resistor 56 which is connected in parallel with capacitor 58, and it is applied through a resistor 60 to capacitor 62. The parallel combination of resistor 56 and capacitor 58 serves to stablize the negative feedback for operational amplifier 54. The combination of resistor 60 and capacitor 62 provides decoupling for operational amplifier 54 and also additional low-pass filtering. The voltage across capacitor 62 is connected through resistor 64 through a center-tapped winding of transformer 66 to drive the direct-coupled port A of double balanced mixer 14 or 16 of FIG. 1. The voltage at the direct-coupled port is applied as a subtractive input to operational amplifier 54 through resistors 82 and 68 with a network 70 attached at their junction. Network 70 comprises parallel reversed diodes 72 and 74 which are connected in series with resistor 76 to ground. In parallel with this combination is resistor 78 and capacitor 80. Network 70 with resistor 82 represents a low-pass filter. In addition, network 70 provides an impedance to generate a feedback voltage for operational amplifier 54 from the current flowing from port B of the ring diodes 86. Transformers 66 and 84 are connected across the ring diodes 86 to form a double balanced mixer. An input signal at terminal 88 will be modulated by a voltage that is a function of the voltage applied at terminal 50 to produce a modulated output at terminals 90. However, when there is no RF input at terminals 88, any input voltage that appears at terminal 50 will be balanced out and will not appear at terminals 90. When there is an RF input at terminal 88 and a voltage at terminal 50 that is an appropriately filtered function of a noise voltage such as that produced by the circuit of FIG. 2, the output voltage at terminal 90 which corresponds to the outputs of double balanced mixers 14 and 16 of FIG. 1, will produce an output from combiner 22 of FIG. 1 that is Rayleigh faded. When there is no input voltage at terminal 88, there will be no output voltage at terminal 90, regardless of the existence of a noise voltage at terminal 50. The result is to produce at terminals 90 a signal that is an amplitude-modulated version of the input signal at terminal 88. This allows the circuit of FIGS. 1, 2, and 3 to be used as a Rayleigh fader for AM and FM, which have carrier signals that are continuous in time and hence will always have a signal at terminal 88 at FIG. 3, and also for signal sideband, which has no input at terminal 88 during intervals when modulation is lacking.

When the circuit of the present invention is used to simulate fading in a typical environment for mobile radio signals, the roll-off of the active filter is chosen to simulate a particular vehicle speed. This is a result of a well-known relation between vehicle speed and the Doppler frequency that is associated with a vehicle speed. Values of components of a circuit that has been built and used successfully to apply Rayleigh-faded signals to radio receivers are listed in the Table.

TABLE

| Values of elements of FIGS. 1, 2 and 3 | |
|---|---|
| Resistors | Capacitors |
| 52 50K | 58 .001 microfarads |
| 56 220K | 62 .001 microfarads |
| 60 1K | 80 .001 microfarads |
| 64 50 ohms | |
| 68 1K | |
| 76 | |
| 78 3.9K | |
| 82 50 ohms | |

It should be noted that the various outputs of quad latch 38 of FIG. 2 allow the possibility of using the circuit of FIG. 2 to drive two of the Rayleigh faders of the present invention. Only two outputs of the quad latch 38 of FIG. 2 will be used to supply the noise sources 18 and 20 of FIG. 1.

Figure 4:
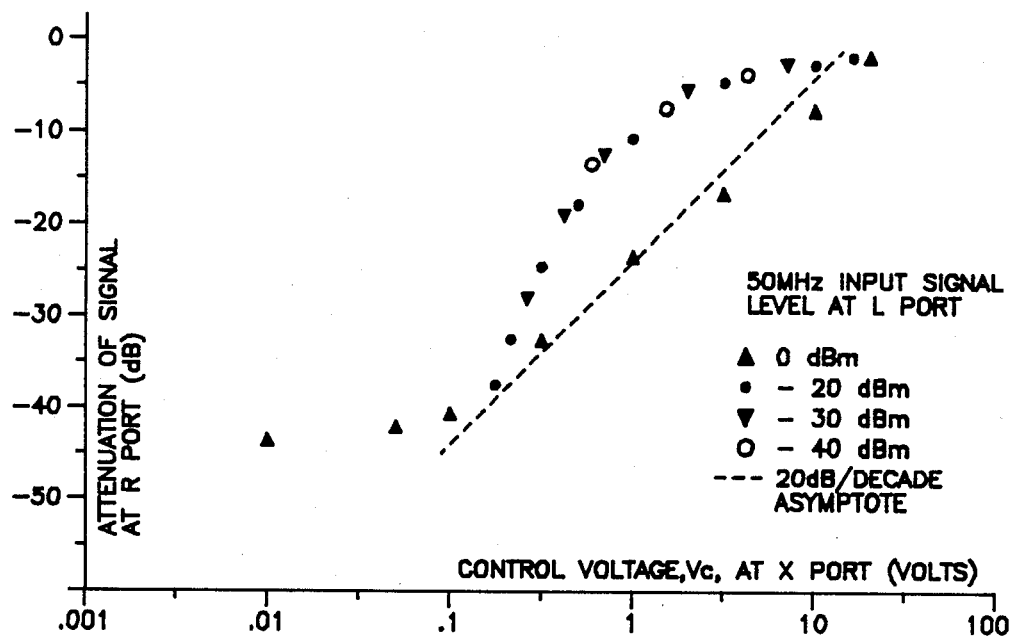
FIG. 4 is a characteristic of a voltage-controlled balanced mixer.

FIG. 4 is a plot of the attenuation of signals applied at the L or local-oscillator port of a balanced mixer as measured at the R or RF port of the balanced mixer. The abscissa of FIG. 4 is the control voltage in volts applied to the IF port of the balanced mixer, here designated the X port. Points are shown in FIG. 4 as labeled for a range of control voltages and for applied signal levels of zero, −20, −30 and −40 dBm. Also labeled in FIG. 4 is an asymptote with a slope of 20 dB/decade. When points are approximately on such an asymptote or a line parallel to it, the balanced mixer acts as a linear signal attenuator which insures that the fader output produces fading characterized by Rayleigh statistics. An examination of FIG. 4 shows that with an applied signal level of zero dBm the points are approximately along the marked asymptote over a range of 2 decades of voltage. When a Rayleigh fader is made according to the prior art, the mixer input signal is made constant at approximately 0 dBm in order that the statistics of the signal fading at the fader output will be Rayleigh. The mixer is not a linear attenuator, and therefore will not permit Rayleigh fading to be generated at the lower applied signal levels of −20, −30, and −40 dBm, can be seen by inspection. It follows from FIG. 4 that Rayleigh fading can only be obtained with mixer input signals having a constant 0 dBm input level. This precludes the generation of Rayleigh fading with an input signal which varies in level.

Figure 5:
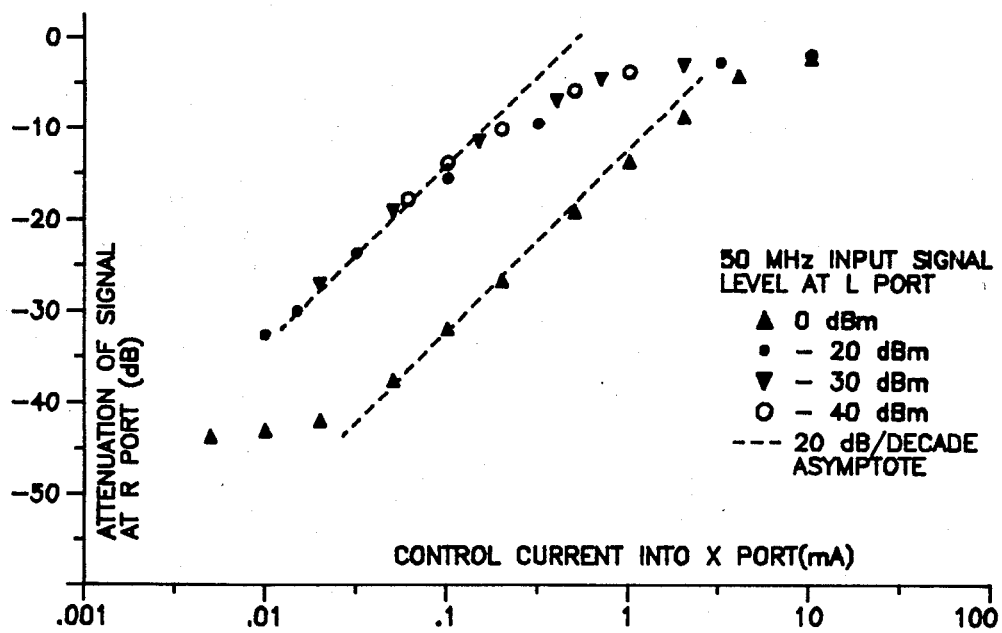
FIG. 5 is a characteristic of a current controlled balanced mixer.

FIG. 5 is a plot of the attenuation of a signal applied at the L or local oscillator port of a balanced mixer as measured at the R or RF port of the balanced mixer. The abscissa of FIG. 5 is the control current in milliamperes flowing into the IF port, here designated the X port. Points are shown in FIG. 5 as labeled for a range of control currents and applied signal levels of zero, −20, −30, and −40 dBm. Also shown in FIG. 5 are two dashed lines that have slopes of 20 dB/decade. Examination of FIG. 5 shows that the balanced mixer, when driven with a current at the X port, is a linear attenuator not only for a L port input signal level of 0 dBm, but also for all the input signal levels that were measured below −20 dBm. This is evidence that, as long as the mixer input signal level is kept at or below −20 dBm, the input signal may be Rayleigh faded regardless of its exact amplitude level.

I claim:

1. A circuit for producing Rayleigh fading of an input signal comprising:
   (a) a powder divider receiving the input signal and producing two divided output signals separated in phase by 90°;
   (b) a first noise current source;
   (c) a first double balanced mixer having a balanced port connected to the power divider and having a direct-coupled port connected to the first noise current source, the first double balanced mixer receiving one of the divided output signals from the power divider and producing a first output;
   (d) a second noise current source;
   (e) a second double balanced mixer having a balanced port connected to the power divider and having a direct-coupled port connected to the second noise current source, the second double balanced mixer receiving the other of the divided output signals from the power divider and producing a second output, the first and second source each comprising a noise voltage source and a voltage-to-current converter connected to the noise voltage source that produces a noise current; and
   (f) an in-phase power combiner connected to the first and second double balanced mixers to produce as an output a sum of voltages from the first and second double balanced mixers which is a Rayleigh-faded version of the input signal.

2. The circuit of claim 1 wherein the first and second noise voltage sources each comprise:
   (a) a square-wave generator;
   (b) a static shift register connected to the clock and receiving as an input an output signal from the clock;
   (c) an exclusive-OR gate connected to the shift register and receiving as inputs output signals from two predetermined stages of the shift register, the exclusive-OR gate connected to the shift register to supply to the shift register an input that is an output of the exclusive-OR gate;
   (d) a divider circuit connected to the clock to produce as an output a divided clock signal;
   (e) a latch connected to the shift register to receive a predetermined bit position from the shift register, the latch clocked by an output from the divider circuit, the latch producing an output signal at a terminal;
   (f) a filter connected to the terminal of the latch to produce said noise voltage.

3. The circuit of claim 1 wherein said input signal is an amplitude modulated signal.

4. The circuit of claim 1 wherein said first and second double balanced mixers each include a diode ring.

5. The circuit according to claim 1 wherein said first and second double balanced mixers each provide substantially linear attenuation of the corresponding output signals from the power divider.

6. The circuit according to claim 3 wherein said first and second double balanced mixers each provide substantially linear attenuation of the corresponding amplitude modulated output signals from the power divider.

7. A method for Rayleigh fading an input signal comprising the steps of:
   (a) dividing the input signal into a first signal and a second signal separated in phase by 90° from the first signal;
   (b) generating first and second noise currents by generating respectively first and second noise voltages, and converting the first and second noise voltages into first and noise currents, respectively;
   (c) generating a first output signal by mixing the first signal with the first noise current in a double balanced mixer;
   (d) generating a second output signal by mixing the second signal with the second noise current in a double balanced mixer; and
   (e) summing the first and second output signal to produce a Rayleigh faded version of the input signal.

8. The method according to claim 7 wherein the steps of generating the first and second output signals each include the step of substantially linearly attenuating the first and second signals, respectively.

9. The method according to claim 7 wherein said input signal is amplitude modulated and wherein steps of generating the first and second output signals each include the step of substantially linearly attenuating the first and second amplitude modulated signals, respectively.

* * * * *

UNITED STATES PATENT AND TRADEMARK OFFICE
CERTIFICATE OF CORRECTION

PATENT NO. : 4,464,791

DATED : AUGUST 7, 1984

INVENTOR(S) : ORVILLE M. ENESS

It is certified that error appears in the above—identified patent and that said Letters Patent is hereby corrected as shown below:

```
In Column 5, line 30, insert -- output --
after "which".

In Column 6, line 26, insert -- second --
after "first and".
```

Signed and Sealed this

Twelfth Day of February 1985

[SEAL]

Attest:

DONALD J. QUIGG

Attesting Officer

Acting Commissioner of Patents and Trademarks